United States Patent [19]

Stevens et al.

[11] Patent Number: 5,637,409
[45] Date of Patent: Jun. 10, 1997

[54] AQUEOUS COATING COMPOSITIONS

[75] Inventors: Emile J. M. Stevens, Tilburg, Netherlands; Peter Lear, Chester, England

[73] Assignees: Zeneca Limited, London, England; Zeneca Resins BV, Waalwijk, Netherlands

[21] Appl. No.: 450,626

[22] Filed: May 25, 1995

Related U.S. Application Data

[62] Division of Ser. No. 892,818, Jun. 5, 1992, Pat. No. 5,446,083.

[30] Foreign Application Priority Data

Jun. 5, 1991 [GB] United Kingdom ............. 9112141

[51] Int. Cl.$^6$ .................................................. B32B 27/00
[52] U.S. Cl. ..................... 428/500; 427/393.5; 428/515; 428/516; 524/458
[58] Field of Search ............... 427/385.5, 393.5; 524/458; 428/500, 515, 526

[56] References Cited

U.S. PATENT DOCUMENTS 5,446,083  8/1995  Stevens et al. ................... 524/458

FOREIGN PATENT DOCUMENTS

| 2028677 | 5/1991 | Canada. |
| 0167042 | 1/1986 | European Pat. Off.. |
| 0333007 | 9/1989 | European Pat. Off.. |
| 3938063 | 5/1991 | Germany. |

OTHER PUBLICATIONS

Derwent Abstract 88-130663 (JP-A-63 075 049) and Abstract 82-38195E (JP-A-57 055 696), May 1988.

Primary Examiner—Michael Lusignan
Attorney, Agent, or Firm—Cushman Darby & Cushman IP Group Pillsbury Madison & Sutro LLP

[57] ABSTRACT

Aqueous coating composition for a plastics, especially a polypropylene, substrate comprising a stable aqueous dispersion derived from dispersing into water with the aid of a surfactant(s) an organic solvent solution of a composition comprising a chlorinated polyolefine(s), at least one olefinically unsaturated monomer which is polymerisable to a polymer during and/or after coating formation and a filmogenic polymer(s).

5 Claims, No Drawings

AQUEOUS COATING COMPOSITIONS

This is a division of application Ser. No. 07/892,818, filed Jun. 5, 1992, now U.S. Pat. No. 5,446,083.

The present invention relates to a filmogenic (ie film-forming) coating composition for application to a plastics, especially a polypropylene substrate.

Many plastics materials are used in applications where coating of the plastics substrate is required. Polypropylene is a particularly difficult plastics material to overcoat and will serve to illustrate the problems associated to a greater or lesser extent with all plastics materials.

The use of polypropylene, either as the pure plastics material or in a rubber-toughened form, has become widespread for a large number of applications because of the excellent general properties of the material coupled with its relatively low price compared with other structural materials of equivalent performance. In particular, polypropylene has become the polymer of choice in the manufacture of various external and internal automobile parts, such as bumpers, side mirror supports, interior panels and door handles. When employing such polypropylene articles, it is often desirable to overcoat the basic substrate to achieve, for example, a protective and/or decorative coating, such as a paint coating, or an adhesive coating for subsequent bonding to another substrate.

Unfortunately, because polypropylene possesses a low surface tension (making initial film-formation thereon difficult) and a low polarity, it is difficult to ensure that an applied coating (derived from a coating composition) adheres effectively to the surface of the polypropylene article.

One approach that has been employed for solving this problem has been to apply a physical treatment, such as an electrical discharge, to the polypropylene so as to provide a polar surface. However, this technique tends to cause a deterioration in bulk physical properties.

Another approach has been to employ solvent-born chlorinated polyolefines's (CPO's) to prime the polypropylene, the CPO being used alone or in conjunction with a filmogenic polymer, such as an acrylic polymer or a urethane polymer, in the primer paint composition. CPO's will in fact adhere effectively to a polypropylene surface providing the level of chlorination therein is not too high; the presence of chlorine is necessary to allow solubility in the commonly used paint solvents such as toluene and xylene. Nevertheless, the use of CPO's suffers from a number of disadvantages: the CPO is poorly compatible with common filmogenic polymers such as acrylics and urethanes so that unwanted separation of the components of the primer composition occurs on storage; the CPO has poor outdoor durability; there is a tendency for the CPO to redissolve in the solvents of additionally applied coatings, causing delamination; there is an occasional tendency for the CPO to dehydrochlorinate; and the use of solvent-borne CPO is environmentally unsound due to the solvent.

We have now discovered new filmogenic coating compositions containing CPO which ameliorate or overcome many and sometimes all of the above-mentioned problems relating to the use of CPO in polypropylene-adherable coating compositions. Such compositions are, moreover, often suitable for providing adherable coatings on other plastics substrates.

According to the present invention there is provided an aqueous filmogenic coating composition suitable for application to a plastics, especially a polypropylene, substrate, which coating composition comprises a stable aqueous dispersion derived from dispersing into water with the aid of at least one surfactant an organic solvent solution comprising at least one chlorinated polyolefine, at least one olefinically unsaturated monomer which is polymerisable to a polymer during and/or after coating formation, and at least one filmogenic polymer.

There is further provided according to the invention a process for the preparation of an aqueous filmogenic coating composition comprising a stable aqueous dispersion and suitable for application to a plastics, especially a polypropylene, substrate, which process comprises preparing an organic solvent solution comprising at least one chlorinated polyolefine, at least one olefinically unsaturated monomer which is polymerisable to a polymer during and/or after coating formation, and at least one filmogenic polymer, and dispersing said organic solvent solution of said composition into water with the aid of a surfactant(s) to form a stable aqueous dispersion.

The aqueous dispersions of the coating compositions of the invention are stable, and can therefore be stored for long periods without the components thereof undesirably settling or separating on standing, whereas organic solvent solutions containing CPO(s), olefinically unsaturated monomer(s), and optionally filmogenic polymer(s) have thus far been found by us not usually to be stable even if they provide compositions yielding polypropylene-adherable coatings. Additionally coatings derived from compositions of the invention have good heat resistance. The overcoatability of the coating derived from the composition of the invention with other coating systems is also good, with there being little tendency of the overcoatings to undergo delamination due to loss of adhesion. The composition of the invention can also be more environmentally sound since it is water-based and although some compositions according to the invention can still contain quite large quantities of organic solvents, others according to the invention can contain much lower quantities of organic solvent (or none at all if the organic solvent is subsequently removed from the aqueous composition). The aqueous composition of the invention also tends to be cheaper than the known solvent-based compositions of CPO.

As mentioned above, the aqueous dispersion of the composition is stable, i.e. is a substantially non-settling, non-separating mixture of the components in an aqueous medium. Thus we have found that the stabilities of the dispersions have been maintained for as long as we have stored them (at least 4 months at ambient temperature (20° to 25° C.), and even at elevated temperatures, e.g. one tested has been stable for at least 5 weeks at 52° C.). The water component of the aqueous medium of the dispersion is usually present at a level which is at least 5 wt. % of the composition (more preferably at least 10 wt. %, particularly at least 25 wt. %); a usual upper limit for the level of water is 90 wt. % (more usually 80 wt. %) of the composition. An amount of organic liquid(s) is often present (remaining from the organic solvent solution for example) although this can sometimes be removed if desired (eg by evaporative techniques such as distillation or thin film evaporation under reduced pressure). The precise nature of the dispersion is not clear to us: probably the components are present in an emulsified state in the dispersion.

A coating is formed from the composition of the invention by applying the composition to a plastics, e.g. polypropylene, substrate, drying the composition (eg by natural or accelerated drying) to form a film coating on the substrate, and concurrently and/or subsequently to said coating formation polymerising the olefinically unsaturated component(s) of the composition. The nature of the final coating is as yet unclear to us, but its properties suggest that a desirable stratification has occurred, with the CPO having migrated substantially to the substrate surface, the filmogenic polymer having migrated substantially to the air interface and the polymer derived from the at least one olefinically unsaturated monomer being located mainly between the two layers.

The CPO component of the composition is generally a chlorinated polypropylene (CPP), examples of which are available commercially from different manufacturers. The CPO's are often supplied by the manufacturer as an organic solvent solution which may be used directly (ie "as is") when preparing a composition according to the invention. Examples of such solvents include polar, and aromatic organic solvents; specific examples include toluene, chlorinated methanes and ethanes, ketones, chlorinated aromatics, and other polar solvents.

The chlorine content of the CPO is usually within the range of from 2 to 50% (by weight of solid polymer), more preferably 10 to 40%. The weight average molecular weight of the CPO is preferably within the range of from 5,000 to 75,000.

The at least one olefinically unsaturated monomer is (are) one(s) which will (co)polymerise during and/or after coating formation providing means to cause polymerisation (usually a free-radical-initiated polymerisation) are present at this stage. Examples of such monomers include butadiene, isoprene, styrene, acrylic and substituted acrylic monomers, e.g. alkyl acrylates, alkyl methacrylates, acrylamides, methacrylamides, acrylonitrile and methacrylonitrile; vinyl halides, e.g. vinyl chloride; vinylidene halides, e.g. vinylidene chloride; vinyl esters; vinyl ethers; vinyl ketones; and heterocylic vinyl compounds; olefinically unsaturated mono- and dicarboxylic acids, e.g. acrylic acid, methacrylic acid, beta-carboxyethyl acrylate, fumaric acid, and maleic acid.

The at least one olefinically unsaturated monomer particularly comprises at least one (meth)acrylic monomer having the formula $$CH_2=CR^1-\overset{\overset{O}{\|}}{C}-XR^2$$

where $R^1$ is H or methyl, X is —O— (ester link) or —NH— (amide link), and $R^2$ is (cyclo)alkyl of 1 to 20 carbons or a bicyclic terpene group.

When two or more olefinically unsaturated monomers are employed they may both (all) be (meth)acrylic esters or amides (as defined above), or they can include olefinically unsaturated monomers of other types, such as acrylic or methacrylic acid, styrene, and vinylidene chloride.

It is particularly preferred that $R^2$ is a bicylic terpene group. Examples of terpene compounds which are suitable for use in producing the terpene (meth)acrylate ester or amide include camphene, beta-pinene, alpha-fenchene, beta-fenchene, and sabinene. It is more particularly preferred that $R^2$ is a bicyclic terpene group having the basic structure of an optionally substituted 7,7-dimethyl norbornanyl group, (i.e. derived from optionally substituted 7,7-dimethyl-norbornane by removal of a hydrogen atom from one of the carbon atoms of the siz-membered ring), or in other words by which we mean the univalent group of basic structural formula:

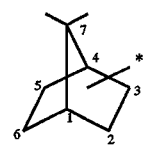

where the valence bond denoted by * is derived by the notional removal of any one of the hydrogen atoms of the six-membered ring (carbon atoms 1,2,3,4,5,6), but particularly one of those attached to carbon atoms 2,3,5, or 6, and which group includes substituted groups of this basic structure type, particularly those having monosubstitution (e.g. by alkyl groups like methyl or ethyl, hydroxyl or chloro) at the 1 and/or 4 positions, such as isoborn-2-yl and born-2-yl groups of formula:

 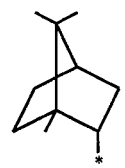   * = valence bond isoborn-2-yl     born-2-yl

The most preferred olefinically unsaturated monomer (when $R^2$ is a bicyclic terpene group) is selected from isobornyl acrylate (or methacrylate), and isobornyl acrylamide (or methacrylamide). Isobornyl acrylate is especially preferred. It is also particularly preferred that $R^2$ is a tertiary octyl group, a preferred olefinically unsaturated monomer of this type being N-tertiary octyl acrylamide. Combinations of preferred monomers (such as isobornyl acrylate and N-tertiary octyl acrylamide may of course also be used.

When the at least one olefinically unsaturated monomer is a monomer of the above formula in which $R^2$ is a bicyclic terpene group (an especially preferred example of which is isobornyl acrylate as discussed supra) and/or a tertiary octyl group (e.g. as in N-tertiary octyl acrylamide), it (they) may be present in the composition as the only olefinically unsaturated monomer(s) or it (they) may be present in conjunction with at least one other olefinically unsaturated monomer, which can be another monomer(s) within the scope of the above formula and/or another olefinically unsaturated monomer(s) not within the scope of the above formula; examples of these have already been mentioned above. More specifically, examples of the at least one other monomer include acids and anhydrides such as acrylic acid, methacrylic acid, and maleic anhydride; (chloro)akyl esters of alpha-beta-unsaturated carboxylic acids such as methyl acrylate, ethyl acrylate, n-propyl acrylate, n-butyl acrylate, n-octyl acrylate, lauryl acrylate, methyl alpha-chloroacrylate, ethyl alpha-chloroacrylate, n-propyl alpha-chloroacrylate, n-butyl alpha-chloroacrylate, beta-chloroethyl acrylate, beta-chloropropyl acrylate, beta-chlorobutyl acrylate, fluorinated acrylates and methacrylates (such as the fluoro analogues of the above chloroacrylates), methyl methacrylate, ethyl methacrylate, n-propyl methacrylate, n-butyl methacrylate, diethyl maleate, diethyl fumarate, hydroxyethyl acrylate, hydroxyethyl methacrylate; vinyl esters such as allyl acetate, allylchloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, o-methyl styrene, m-methyl styrene, p-methyl styrene, pentachlorostyrene, o-chlorostyrene, m-chlorostyrene, p-chlorostyrene, m-bromostyrene, p-bromostyrene, 2,5-dichlorostyrene, p-dimethylaminostyrene, p-methoxy-styrene and p-cyanostyrene; conjugated dienes or chlorodienes such as butadiene and chloroprene, vinyl-substituted heterocyclic imines such as 2-vinylpyridine and vinyl carbazole; vinyl ketones such as methyl vinyl ketone.

Generally speaking, when using an olefinic monomer(s) in addition to the monomer(s) of the above-defined formula where $R^2$ is a bycyclic terpene group and/or a tertiary octyl group, the relative amounts of each (with respect to each other) are such that the weight ratio of terpene monomer(s) and/or tertiary octyl monomer(s) to other olefinic monomer (s) is preferably within the range of from 99.9/0.1 to 0.1/99.9, more preferably 90/10 to 20/80.

The composition of the invention may also optionally include at least one multifunctional material, i.e. a material having at least two olefinic double bonds which can each (i.e. separately) take part in a (usually free-radical-initiated) addition polymerisation, and which, for convenience, we consider here as being a separate entity from the olefinically unsaturated monomers discussed supra (which are not considered as multifunctional, but are monofunctional with regard to their olefinic double bonds—most having only one double bond anyway, but some, such as conjugated dienes like butadiene, having two double bonds which do not independently take part in polymerisation so that such monomers are still monofunctional with regard to their double bonds). Such a multifunctional material, which can provide a degree of crosslinking in the resulting coating after polymerisation, may be polymeric, oligomeric or monomeric in nature but is preferably a monomeric material. It may e.g. be di-, tri-, or tetra-functional (i.e. have 2, 3 or 4 olefinically unsaturated carbon-carbon double bonds). Suitable examples of multi-functional materials for optional use in the composition of the invention include trimethylol propane triacrylate, 1,3-butylene glycol dimethacrylate, ethylene glycol diacrylate, ethylene glycol dimethacrylate, Bisphenol-A-dimethacrylate, diethylene glycol dimethacrylate, pentaerythritol triacrylate, pentaerythritol tetraacrylate, triethylene glycol dimethacrylate, trimethylene glycol dimethacrylate, trimethylol propane triacrylate, triethoxylated trimethylol propane triacrylate, tetraethylene glycol diacrylate, ethoxylated Bisphenol-A-dimethacrylate, pentaerythritol tetramethacrylate, allyl acrylate; allyl crotonate, allyl methacrylate, diallyl acrylate, diallyl fumarate, diallyl maleate, diallyl phthalate, diallyl-oxyethyl methacrylate, melamine acrylate, triallyl-5-triazine, vinyl trialloxy silane, triallyl cyanurate, 1,6-hexanediol diacrylate, divinyl benzene, diallyl amine, and diallyl maleate methacrylate.

The multifunctional material (if used) is usually incorporated by being a dissolved component of the organic solvent solution.

Any suitable filmogenic polymer may be used in the composition of the invention provided it is soluble in the organic solvent medium used for the first step of the process to make the composition, and provided it is a filmogenic type (i.e. film-forming when cast from the final aqueous coating composition). It must not of course be a chlorinated polyolefine. The choice of the filmogenic polymer may often be determined by the nature of any potential overcoating system that may subsequently be applied to the coating derived from the composition. Thus, e.g., it is obviously desirable that the filmogenic polymer should be of a type that will (in the form of cast film) be properly adherable to a subsequently applied coating (e.g. a paint or adhesive coating), and the filmogenic polymer may often be selected with this in mind.

Examples of such filmogenic polymers particularly include olefinic addition polymers, such as acrylic polymers, and such polymers can often be suspension polymers (i.e. prepared by an aqueous suspension polymerisation process).

By an "olefinic addition polymer" is meant a polymer formed by the free-radical addition (co)polymerisation of at least one olefinically unsaturated monomer.

Examples of such monomers include 1,3-butadiene, isoprene, styrene, divinyl benzene, acrylonitrile, methacrylonitrile, vinyl halides such as vinylidene chloride and vinyl chloride, vinyl esters such as vinyl acetate, vinyl propionate and vinyl laurate, heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

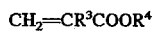

$$CH_2=CR^3COOR^4$$

where $R^3$ is H or methyl and $R^4$ is (cyclo)alkyl of 1 to 20 carbon atoms (more preferably 1 to 6 carbon atoms) examples of which are methyl acrylate, methyl methacrylate, ethyl acrylate, ethyl methacrylate, n-butyl acrylate, n-butyl methacrylate, isopropyl acrylate, isopropyl methacrylate, n-propyl acrylate, n-propyl methacrylate, cyclohexyl acrylate and cyclohexyl methacrylate.

The olefinic addition polymer may optionally comprise repeat units derived from at least one olefinically unsaturated functionalised monomer. Such functional groups are particularly those which can impart curability or graftability to the resulting poller (such as hydroxyl, carboxyl, glycidyl, amino and siloxane groups). The olefinic addition polymer will normally contain 0 to 50 weight % (0 to 20 weight %) of units of such functionalised monomers (if present, usually 1 to 50 weight %, preferably 1 to 20 weight %) together with the corresponding amount of non-functionalised monomer units, e.g. one or more of those illustrated supra. Examples of functionalised monomers include those of formula $CH_2=CR^5CO_2R^6$ where $R^5$ is H or methyl and $R^6$ is H or hydroxyalkyl or hydroxycycloalkyl of 1 to 20 carbon atoms (more preferably 1 to 6 carbon atoms) examples of which include acrylic acid, methacrylic acid, 2-hydroxyethyl methacrylate and 2-hydroxyethyl acrylate.

The olefinic addition polymers are, for example, vinyl chloride polymers (homo and copolymers), styrene polymers (homo and copolymers), and acrylic polymers (homo and copolymers).

In an advantageous embodiment of the invention suitable for many intended applications, the filmogenic polymer is a polymer of the acrylic type, particularly a suspension polymer of the acrylic type. By an acrylic polymer is meant herein a polymer (homo or copolymer) comprising a preponderant level of repeat units (e.g. at least 50 weight %, more preferably at least 80 weight %) derived from at least one (meth)acrylate having the formula as defined supra, i.e. $CH_2=CR^3COOR^4$ where $R^3$ is H or methyl and $R^4$ is (cyclo)alkyl of 1 to 20 carbon atoms (more preferably 1 to 6 carbon atoms). Examples of these are, in particular, methyl acrylate, methyl methacrylate, ethyl acrylate, ethyl methacrylate, n-butyl acrylate, cyclohexyl acrylate and cyclohexyl methacrylate. The acrylic polymer may optionally comprise repeat units derived from at least one olefinically unsaturated monomer which is not a (meth)acrylate as defined above. This other type of monomer(s) may be a functionalised monomer(s) and/or a non-functionalised monomer(s). Again, functionalised groups are particularly those which can impart curability or graftability to the resulting acrylic polymer (such as hydroxyl, carboxyl, glycidyl, amino and siloxane groups). Examples of some functionalised monomers were given above.

The acrylic polymer will typically contain 50 to 100 weight % (80 to 100 weight %) of units derived from (meth)acrylate monomer(s) of formula $CH_2CH_3COOR^4$ and 0 to 50 weight % (0 to 20 weight %) of units derived from at least one other olefinically unsaturated monomer (functionalised and/or non-functionalised) (if present, usually 1 to 50 weight %, preferably 1 to 20 weight %, with the corresponding amount of (meth)acrylate monomer(s) being present). Examples of functionalised monomers and non-functionalised non-(meth)acrylate monomers include hydrocarbon monomers e.g. butadiene, isoprene, styrene, and divinyl benzene; functionalised or non-functionalised acrylic-type monomers, e.g. hydroxyethyl acrylate or methacrylate, glycidyl methacrylate, acrylic or methacrylic acid, acrylamide, methacrylamide, and acrylonitrile; vinyl halides, e.g. vinyl chloride; vinylidene halides, e.g. vinylidene chloride; vinyl esters; vinyl ethers; vinyl ketones; and heterocyclic vinyl compounds. Multi-functional monomers (with respect to double bonds) such as diallyl phthalate and allyl methacrylate may also be included as comonomers (and not just in acrylic polymers but in olefinic addition polymers generally).

The aqueous suspension polymerisation of monomer(s) to form the polymer should be conducted using a suspension agent system and a free-radical-yielding monomer-soluble initiator or combination of initiators.

The suspension agent employed in the suspension polymerisation process is normally one or more of those used generally for the polymerisation of olefinically unsaturated monomers in aqueous suspension. Examples of these include protective colloids such as partially hydrolysed polyvinyl acetate (various degrees of hydrolysis), gelatin, polyvinyl pyrrolidone, polyacrylic acid, and cellulose derivatives, e.g. methyl cellulose, carboxymethyl cellulose and hydroxyethyl cellulose. The suspension agent may be used in a conventional quantity—generally speaking from 0.01 to 8% by weight (0.01 to 6%) calculated on monomer weight.

Any suitable free-radical yielding polymerisation initiator (or combination of initiators) that is monomer-soluble may be used in the suspension polymerisation process. Examples of these include peroxy compounds such as di-tertiarybutyl peroxide, acyl peroxides such as lauroyl peroxide and benzoyl peroxide, acetyl cyclohexy sulphonyl peroxide, peresters such as tertiarybutyl peroctoate, percarbonates, and azo compounds such as azo-bis-iso-butyronitrile and 2,2'-azo-bis-2,4-dimethyl-valero-nitrile. Monomer-soluble free-radical-yielding polymerisation initiators that are particularly suitable for use in the polymerisation process for making acrylic polymer are the acyl peroxides such as benzoyl peroxide and lauroyl peroxide, and azo compounds such as azo-bis-isobutyronitrile. The initiator(s) may be used in a conventional quantity—generally speaking from 0.1 to 10% by weight (0.1 to 6%) calculated on monomer weight.

The operating temperature conditions for the suspension polymerisation will obviously depend on the particular monomer(s) being polymerised, but polymerisation temperatures will often be within the range 40° to 100° C. when making acrylic polymers.

The resulting granular suspension produced from the polymerisation may be worked up in conventional manner e.g by filtering or centrifuging to remove the bulk of the aqueous phase, optionally washing (if necessary), and drying. When operating on a large scale, residual monomer(s) from the polymerisation should be removed if necessary from the suspension before water removal.

It may be pointed out that a wide range of filmogenic polymers (including acrylic suspension polymers) are available commercially and therefore do not need to be especially prepared for the purposes of the invention (but instead can be brought in).

The preferred quantities for the above discussed materials contained in the aqueous composition of invention (based on the total weight of these components in the composition), are as follows:

CPO: 0.1 to 90 wt. % (more preferably 0.5 to 50 wt. %)
olefinically unsaturated monomer(s): 5 to 94.9 wt. % (more preferably 25 to 75 wt. %)
multifunctional material(s): 0 to 75 wt. % (more preferably 0.1 to 50 wt. %)
filmogenic polymer(s): 5 to 94.9 wt. % (more preferably 15 to 60 wt. %)

The organic solvent medium used to make the organic solvent solution will be one or more suitable organic solvents (which may be the same as or may include any organic solvent in which the CPO is supplied, eg by the manufacturer, if indeed the CPO is made available in such a carrier medium). Examples of suitable solvents include alkanols such as methanol, ethanol, n-propanol and iso-propanol, ketones such as methyl ethyl ketone, aromatic solvents such as toluene and xylene, and common chlorinated solvents such as trichloroethylene, methylene chloride, chloroform and carbon tetrachloride. Particularly preferred organic solvents include toluene and methyl ethyl ketone. The organic solvent can also in some cases be provided, in part or in whole, by the at least one olefinically unsaturated monomer; therefore in cases where the monomer(s) provides all or most of the solvent, the system is substantially or entirely free of conventional (non-polymerisable) volatile organic solvent. The solid contents of the organic solvent solution will usually be within the range of from 100 to 25 wt. %, more usually from 95 to 25 wt. %, (particularly 80 to 40 wt. %). (N.B. for the purposes of this specification, the solids content of any solution or dispersion, whether organic- or aqueous-based, includes the contribution of any liquid component provided by the olefinic monomer(s) (if liquid), which for the purposes of determining solids contents is treated as notionally being a solid since it will become a solid after polymerisation on coating formation).

The dispersion of the organic solvent solution into water may be effected using any appropriate technique. For example water may be added to the (usually stirred) organic solvent solution, or vice versa. The surfactant(s) used to aid the dispersion is normally contained in the water phase prior to dispersion. Examples of suitable surfactants include anionic and/or non-ionic emulsifiers such as Na salts of dialkylsuphosuccinates, Na salts of sulphated oils, Na salts of alkyl sulphonic acids, Na, K and ammonium alkyl sulphonates, alkali metal salts of aryl sulphonic acids, $C_{12}$–$C_{24}$ fatty alcohols, ethoxylated fatty acids and/or fatty amides, and Na salts of fatty acids such as Na stearate and Na oleate; the amount used is usually 0.1 to 15% by weight on the total weight of the solid components of the composition (i.e. not including water or conventional organic solvents, and treating any liquid monomer as a solid for this purpose). Many surfactants that have been found to be suitable are commercially available materials, and their chemical constitution is not known to us.

The polymerisation of said at least one olefinically unsaturated monomer to a polymer [together with the crosslinking (curing)—type polymerisation resulting from the multifunctional material (if present)] in the applied coating is usually effected photolytically or thermally. If effected photolytically, the applied coating is subjected to appropriate radiation, such as ultra-violet, visible, or electron-beam radiation. In the case of using ultra-violet or visible radiation, appropriate photo initiators (or photoinitiator systems) are usually required in the composition (to photolytically generate the necessary initiating free radicals), examples of which include halogenated polynuclear ketones such as chlorosulphonated benzanthones, chlorosulphonated fluorenones, alpha-haloalkylated benzanthones, alpha-haloalkylated fluorenones, and optionally substituted alkylphenones such as 2-hydroxy-2-methyl-1-phenyl-propane-1-one ("Darocure" 1173). If electron-beam radiation is employed, photoinitiator is not required (but may still be present if desired).

In the case of using heat to effect polymerisation, an appropriate thermal initiator (or thermal initiator system) will be required in the composition to thermally generate the necessary initiating free-radicals. Examples of thermal initiators included peroxides such as benzoyl peroxide, hydrogen peroxide, tert butylhydroperoxide, and tert butyl per-2-ethyl hexanoate; azo compounds such as azo bis isobutyronitrile and 2,2'-azobis[2-(2-imidazolin-2-yl)propane] dihydrochloride; and persulphates such as $NH_4$, K or Na persulphate. The heat treatment will usually be within the range of from 20° to 150° C., more especially 50° to 120° C.

Accelerator compounds (such as dimethylethanolamine N,N-dimethylbenzylamine and N,N-bis(2-hydroxypropyl)-p-toluidine) may be included, if desired or necessary, as part of the initiator system (photolytic or thermal).

Generally speaking, although the compositions can be radiation- or thermally treated, radiation (particularly ultra-violet) treated coatings will be more resistive. The performance of thermally treated coatings normally improves with increasing treatment temperature.

The amount of initiator system (photolytic or thermal) in the composition of the invention (including any accelerator) is normally within the range of 0 to 10% by weight, based on the dry weight of all the polymerisable components present in the composition; the lower limit of zero is because its use is optional when using electron-beam radiation as described before. If used, however, it is normally present in an amount of 0.1 to 10%, preferably 0.5 to 5%, by weight on the polymerisable components.

The initiator may be incorporated into the composition of any stage of its preparation, but is usually incorporated by simply admixing with the aqueous dispersion obtained from the organic solvent solution; if possible this is done fairly soon before the use of the aqueous coating composition.

Another optional but often useful additive is a plasticiser (s), as such a material(s) may circumvent any slight tendency of the resulting (polymerised) film to be brittle in flexure of the substrate (and hence cause lowered adhesion of the film thereto). A plasticiser will normally be incorporated by addition to the organic solvent solution prior to dispersing in water. If present, its level will normally be within the range of 2 to 10% by weight (based on the dry weight of all the components in the composition). Examples of suitable plasticisers include esters of polycarboxylic acids such as phthalic acid, isophthalic acid, terephthalic acid, adipic acid, azalaic acid, sebacic acid, and mellitic acid. Phosphoric acid esters, such as trioctyl phosphate, tricresyl phosphate, tritolyl phosphate and trixylyl phosphate, and polyester plasticisers such as polypropylene laurate, soya bean oil derived plasticisers such as epoxidised soya bean oil and chlorinated paraffins may also be used. Particularly suitable plasticisers include the $C_{2-14}$ alkyl esters of dicarboxylic acids, examples of which include dibutyl phthalate, dihexyl phthalate, dioctyl phthalate, di-iso-octyl phthalate, dinonyl phthalate, a mixture of $C_{7-9}$ dialkyl phthalates, ditridecyl phthalate, butyl benzyl phthalate, dibutyl adipate, dihexyl adipate, doctyl adipate, di-iso-octyl adipate, dibutyl sebacate and dioctyl sebacate.

The aqueous composition of the invention may, as explained supra, be readily applied to an untreated polypropylene substrate, although this does not of course preclude it being applied to a substrate that has been treated.

The coating composition may be employed as a decorative or protective coating in its own right, or may be employed to provide a primer coating prior to the application of one or more further coatings (e.g. paint coatings or adhesive coatings). For such purposes it may be used "as is" or further diluted with water and/or organic solvent, or it may be supplied in more concentrated form by evaporation of water and/or organic components of the liquid medium. The coating composition may be applied to a polypropylene substrate by any conventional method, including brushing, dipping, flow coating, spraying, spreading with a knife or rod or roller, and the like. The coating is normally formed by application of the coating composition to the substrate, drying the composition (e.g. by natural or accelerated drying) to form a film coating on the substrate and concurrently and/or subsequently to said coating formation polymerising the olefinically unsaturated component or components therein (as described supra).

The coating composition of the invention typically has a solids content of from about 10% to 85% by weight, more usually 20% to 70% by weight.

The composition of the invention may include, or be subsequently formulated with, various other ingredients. For example, it may if desired include, or subsequently be formulated with, ingredients commonly employed in film-forming coating formulations such as defoamers, rheology control agents, thickeners, dispersing and stabilizing agents (usually surfactants), wetting agents, fillers, extenders, fungicides, coalescing solvents, plasticisers, anti-freeze agents and pigments. For many applications, it is envisaged that the composition will be in the form of, or will subsequently be used in a formulation to provide, a paint, and will therefore include materials commonly employed in paint formulations, such as pigments and other ingredients where appropriate (extenders, stabilisers, thickeners, coalescing solvents, defoamers, surfactants, and so on).

The present invention is now illustrated by reference to the following examples. Unless otherwise specified, all parts, percentages and ratios are on a weight basis.

The words Darocure, Trapylene, Neocryl, Atlas and Akyporox used herein are believed to be registered trade marks.

In most of the examples, coating compositions according to the invention were coated onto pure polypropylene (homopolymer) plaques of 2 mm thick stereoregular polypropylene.

The polypropylene plaques were all degreased prior to coating by wiping with a tissue soaked in a 1:1 mixture of isopropyl alcohol and constant boiling gasoline 80°–110° C. fraction. The polymer samples in the coating compositions were sometimes admixed (if necessary) with co-solvent (e.g. xylene or cyclohexane) to achieve appropriate wetting behaviour.

Film coatings were applied by a wire-wound rod such that the dry coating thickness was between 30 and 45 µm. The coated plaques were subsequently treated as described in the following examples before testing for coating adhesion.

The following methods of assessing adhesion were employed in these examples.

Gitterschnitt Test (DIN No.53151 or ASTM D-3359B)

The coating is crosshatched with a sharp knife so as to produce squares approximately 1 mm×1 mm. A standard cellulosic tape is firmly and uniformly applied over the crosshatched area and then firmly pulled away an angle of 180° C. to the substrate surface. The crosshatch is examined to assess how much coating has been pulled away, and a rating awarded as follows.

GT-0 The crosshatched coating is completely free from damage.
GT-1 5% of the coating has been pulled away.
GT-2 15% of the coating has been pulled away.
GT-3 35% of the coating has been pulled away.
GT-4 65% of the coating has been pulled away.
GT-5 complete loss of the coating.

Scrape Test

This is a very rigorous test which involves scraping at the coating with a metal implement (such as the rounded end of a spatula). The ease with which the coating is removed is a reflection of both its toughness and adhesion. The results are graded "poor"; "moderate"; "good"; "excellent.

EXAMPLES 1 AND 2 (COMPARATIVE)

Compositions (not according to the invention) were prepared according to the following recipes.

| | | Wts. (gms) | |
|---|---|---|---|
| No. | Components | Example 1 | Example 2 |
| 1. | "Trapylene" S206* | 40.0 | 40.0 |
| 2. | Methylmethacrylate (MMA) | 56.0 | — |
| 3. | Isobornylacrylate (IBOA) | — | 56.0 |
| 4. | Trimethylopropane triacrylate (TMPTA) | 4.0 | 4.0 |

*A chlorinated polypropylene of 33-34% chlorine content and number average molecular weight 6,000 supplied by Sanyo Kokasaku Pulp Co. as a 50% solution in toluene.

Components 1,2,3 and 4 are added to a flask equipped with a stirrer and allowed to mix for 30 minutes under ambient conditions. Just prior to adhesion testing, a heat sensitive free radical initiator azobisisobutyronitrile (AIBN) and accelerator dimethylethanolamine (DMEA) are blended into the solutions synthesised above as follows:

| | A (gms) | B (gms) | C (gms) | D (gms) |
|---|---|---|---|---|
| Example 1 | 50.00 | 50.00 | — | — |
| Example 2 | — | — | 50.00 | 50.00 |
| AIBN | 0.18 | 0.18 | 0.18 | 0.18 |
| DMEA | 0.06 | 0.12 | 0.06 | 0.12 |

Adhesion testing was carried out on polypropylene plaques as described supra, the applied solutions A–D being first cured for 60 minutes at 70° C. The following results were obtained.

| Gitterschnitt Coating | Adhesion |
|---|---|
| A | Gt-2 |
| B | Gt-0 |
| C | Gt-0 |
| D | Gt-0 |

Whilst the adhesion results are generally satisfactory the solution polymer compositions (without the initiator) were unstable, gelling after some weeks.

EXAMPLE 3 (COMPARATIVE)

A composition (not according to the invention) was prepared according to the following recipe (in which there is partial replacement of the IBOA of Example 2 with an acrylic suspension polymer.

| No. | Component | Wt. (gms) |
|---|---|---|
| 1 | "Trapylene" S206 | 40.00 |
| 2 | IBOA | 29.60 |
| 3 | "NeoCryl" B-725* | 29.60 |
| 4 | TMPTA | 0.80 |

*An acrylic bead (suspension) polymer supplied by ICI Specialties.

1, 2 and 4 are placed in a flask equipped with a stirrer. 3 is then gradually added and stirring continued until it is fully dissolved. The following blend was then made prior to adhesion testing:

| | Wt. (gms) |
|---|---|
| Solution from Example 3 | 20.00 |
| Methyl ethyl ketone (MEK) | 2.00 |
| AIBN | 0.12 |
| DMEA | 0.12 |

A wet film of 50 µm thickness was cast on a polypropylene plaque and cured for 60 minutes at 70° C. Gittershchnitt adhesion: Gt-0

Whilst this technique gave a cheaper composition with a lower content of acrylic monomer, its long term stability was found to be no better than in Examples 1 and 2.

EXAMPLE 4

A composition according to the invention was prepared using the following recipe.

| No. | Component | Wt. (gms) |
|---|---|---|
| 1. | Solution from Example 3 | 77.53 |
| 2. | H₂O (dem.) | 21.18 |
| 3. | "Atlas" G4809** | 0.57 |
| 4. | "Akyporox" OP 250V# | 0.72 |

**Nonionic surfactant available from ICI Speciality Chemicals
Anionic surfactant available from Chemy.

Place 1 in a flask equipped with a stirrer. Make a solution of 3 and 4 in 2 and add gradually to 1 whilst mixing. After addition is complete continue stirring for a further hour. The resulting aqueous dispersion is free of lumps and possessed of remarkable stability. After 5 weeks at 52° C. its appearance was completely unchanged.

The dispersion was blended with initiator and accelerator as follows:

|  | A | B | C |
|---|---|---|---|
| Dispersion from Example 4 | 20.00 | 20.00 | 20.00 |
| Ammonium persulphate, 1% aq. solution | 0.45 | 1.12 | 2.25 |
| DMEA | 0.13 | 0.13 | 0.13 |

Films of 50 μm wet thickness were made on polypropylene plaques and heated in the oven for 60 minutes at 70° C.

|  | A | B | C |
|---|---|---|---|
| Gitterschnitt | Gt-0 | Gt-0 | Gt-0 |
| Scratch | Good | Mod./good | Moderate |

If the coatings were cured using ultra-violet radiation the scratch resistance is raised to "excellent". [The conditions for this were modified as follows. The dispersions from Example 4 (20 g samples) were blended with 2% of "Darocure" 1173 (commercially available photoinitiator) on solids w/w. Films of 50 um wet thickness were coated onto polypropylene plaques, dried for 5 minutes at 70° C. and cured using a Primarc minicure equipped with a double 9 inch Hg lamp, delivering 80 watts/cm. 3 passes were made at a speed of 7.2 m/minute.]

EXAMPLE 5 (COMPARATIVE)

A composition (not according to the invention) was prepared using the following recipe, the feature investigated here being the replacement of the IBOA monomer with a preformed IBOA/lauryl acrylate copolymer.

Preparation of the preformed copolymer was carried out as follows:

| No. | Component | Grams |
|---|---|---|
| 1. | Toluene | 49.18 |
| 2. | IBOA | 41.80 |
| 3. | Lauryl acrylate (LA) | 7.38 |
| 4. | Benzoyl peroxide (75% in water) | 0.41 |
| 5. | Benzoyl peroxide (75% in water) | 0.41 |
| 6. | Benzoyl peroxide (75% in water) | 0.41 |
| 7. | AIBN | 0.41 |

Place 1, 2, 3 and 4 in a reactor equipped with thermometer, stirrer and condenser. Raise the contents to 80°±2° C. and allow to react for 1 hour. Add 5, react for 1 hour further; add 6 and react for an additional 0.5 hours followed by adding 7 and reacting for a final 0.5 hours at 80°±2° C., Cool to ambient temperature. This copolymer is then utilised as follows:

| No. | Component | A (gms) | B (gms) | C (gms) |
|---|---|---|---|---|
| 1. | IBOA/LA copolymer | 39.72 | 35.18 | 32.67 |
| 2. | "NeoCryl" B725 | 23.83 | 20.23 | 18.78 |
| 3. | MEK | — | 3.52 | 3.26 |
| 4. | "Trapylene" S206 | — | 11.72 | 10.89 |
| 5. | "Atlas" G4809 | 0.75 | 0.75 | 0.75 |
| 6. | "Akyporox" OP 250V | 0.94 | 0.94 | 0.94 |
| 7. | H$_2$O (dem.) | 34.76 | 31.17 | 29.56 |

The dispersions were made using the same procedure as in Example 4 and similarly combined with ammonium persulphate/DMEA initiator system as per Example 4.

50 μm wet films were coated on a polypropylene plaque and dried for 60 minutes at 70° C.

|  | A | B | C |
|---|---|---|---|
| Gitterschnitt | Gt-5 | Gt-5 | Gt-2 |

The dispersions showed phase separation within 3 weeks at room temperature.

EXAMPLE 6

Compositions according to the invention were prepared according to the following recipes, the features varied here being a reduction in the CPO and solvent contents (in comparison to earlier examples).

|  |  | Wts. in gms | | |
|---|---|---|---|---|
| No. | Component | A | B | C |
| 1. | "Trapylene" S206 | 27.00 | 17.47 | 8.73 |
| 2. | IBOA | 23.76 | 26.15 | 28.33 |
| 3. | TMPTA | 0.54 | 0.54 | 0.54 |
| 4. | MEK | 2.18 | 2.18 | 2.18 |
| 5. | Toluene | — | 4.77 | 9.13 |
| 6. | LA | 4.19 | 4.19 | 4.19 |
| 7. | "NeoCryl" B725 | 16.20 | 18.57 | 20.77 |
| 8. | "Atlas" G4809 | 1.03 | 1.03 | 1.03 |
| 9. | "Akyporox" OP 250V | 1.29 | 1.29 | 1.29 |
| 10. | H$_2$O (dem.) | 23.81 | 23.81 | 23.81 |

Place components 1 to 6 inclusive in a flask equipped with a stirrer and mix for 5 minutes. Add 7 gradually and stir for 1 hour, or until completely dissolved. Then add a solution of 8 and 9 in 10 and stir for 1 further hour. The resulting stable aqueous dispersions are then mixed with an initiator system as follows:

| No. | Component | A | B | C |
|---|---|---|---|---|
| 1. | Dispersion A | 20.00 | — | — |
| 2. | Dispersion B | — | 20.00 | — |
| 3. | Dispersion C | — | — | 20.00 |
| 4. | VA-44* (5% sol. in H$_2$O) | 1.14 | 1.24 | 1.32 |
| 5. | Accelerator A# (5% solution in MEK) | 0.57 | 0.62 | 1.66 |

*2,2'-azobis[2-(2-imidazolin-2-yl) propane] dihydrochloride
N,N-bis(2-hydroxypropyl)-p-toluidine Films of 50 μm wet thickness were cast on polypropylene plaques and the films cured for 30 minutes at 80° C. The following adhesion results were obtained:

|  | A | B | C |
|---|---|---|---|
| Gitterschnitt | Gt-0 | Gt-0 | Gt-0 |
| Scratch | Excellent | Excellent | Excellent |

As a general observation, all coatings derived from the exemplified compositions according to the invention maintained adhesion after 14 days at 52° C.; no evidence of change due to dehydrochlorination could be observed.

EXAMPLE 7

Compositions according to the invention were prepared using the following recipes. The feature investigated here was the use of isobornyl acrylate/N-tertiary octyl acrylamide as the at least one unsaturated olefinic monomer in various ratios to show the possibility of reducing volatile organic solvent content.

|   |   | A | B | C | D | E |
|---|---|---|---|---|---|---|
| 1. | "Trapylene" S206 | 8.571 | 8.571 | 8.571 | 8.571 | 8.571 |
| 2. | IBOA | 23.942 | 17.954 | 11.971 | 5.983 | — |
| 3. | LA | 7.983 | 7.983 | 7.983 | 7.983 | 7.983 |
| 4. | TMPTA | 0.531 | 0.531 | 0.531 | 0.531 | 0.531 |
| 5. | N-Tertiaryoctyl acrylamide (nTOA) | — | 5.988 | 11.971 | 17.960 | 23.942 |
| 6. | Toluene | 8.971 | 8.971 | 8.971 | 8.971 | 8.971 |
| 7. | "NeoCryl" B725 | 20.400 | 20.400 | 20.400 | 20.400 | 20.400 |
| 8. | "Atlas" G4809 | 1.633 | 1.633 | 1.633 | 1.633 | 1.633 |
| 9. | "Akyporox" OP 250V | 2.041 | 2.041 | 2.041 | 2.041 | 2.041 |
| 10. | $H_2O$ (dem.) | 25.926 | 25.926 | 25.926 | 25.926 | 25.926 |
| A | IBOA/nTOA ratio = 100/0 | | IBOA + nTOA/LA ratio = 75 25 | | | |
| B | IBOA/nTOA ratio = 75/25 | | IBOA + nTOA/LA ratio = 75/25 | | | |
| C | IBOA/nTOA ratio = 50/50 | | IBOA + nTOA/LA ratio = 75/25 | | | |
| D | IBOA/nTOA ratio = 25/75 | | IBOA + nTOA/LA ratio = 75/25 | | | |
| E | IBOA/nTOA ratio = 0/100 | | IBOA + nTOA/LA ratio = 75/25 | | | |

Bring 2, 3, 4, 5, 6 together in a flask, heat to 40°–45° C. Let the mixture stir until 5 has been dissolved. Add 7 at 40°–45° C., let the mixture stir until 7 has been dissolved. Cool to 25°–30° C. and add 1. Stir for about 10 minutes. Prepare a solution of 8 and 9 in 10. Add this slowly to 1–7, so that mixing is maintained. After addition of 8, 9 and 10 the dispersion is mixed for at least 1 hour at room temperature.

Films of 50 μm wet film thickness were cast, after combining the stable aqueous dispersions with an initiator system, onto polypropylene plaques and the films cured, thermally and by ultra-violet radiation as follows:

I=Thermal cure: addition of 2% benzoyl peroxide on active material plus 0.5% N,N-dimethylbenzylamine; 1 hour reaction at 80° C. and 110° C.

II=UV cure: addition of 2% "Darocure" 1173 on active material. 5 minutes flash off at 80° C.; curing using 3 passes at a speed of 10m/minute using a lamp delivering 80 watts/cm.

The following Gitterschnitt results were obtained.

| | I | | II |
|---|---|---|---|
| | 80° C. | 110° C. | |
| A | Gt-0 | Gt-0 | Gt-0 |
| B | Gt-0 | Gt-0 | Gt-0 |
| C | Gt-0 | Gt-0 | Gt-0 |
| D | Gt-0 | Gt-0 | Gt-0 |
| E | Gt-0 | Gt-0 | Gt-0 |

Recipes A and E of this example were also tested for adherence to other plastics materials; curing was effected with UV in the same way as on polypropylene.

| Plastics material | Adhesion | |
|---|---|---|
| | A | E |
| PPO (polyphenylene oxide) | Gt-0 | Gt-0 |
| ABS (acrylonitrile/butadiene/styrene copolymer) | Gt-0 | Gt-0 |
| Polystyrene | Gt-0 | Gt-0 |

EXAMPLE 8

A composition according to the invention was prepared according to the following recipe.

| No. | Components | wt. (gms) |
|---|---|---|
| 1. | "Trapylene" S206 | 12.5 |
| 2. | Methyl methacrylate | 40.7 |
| 3. | "Neocryl" B725 | 29.8 |
| 4. | Laurylacrylate | 6.0 |
| 5. | TMPTA | 0.8 |
| 6. | Toluene | 13.1 |
| 7. | MEK | 3.1 |

Place components 1, 2, 4, 5, 6 and 7 in a flask equipped with a stirrer and mix for 5 minutes. Add 3 gradually and stir until completely dissolved. Then prepare separately a solution of the following: 2.4 g of "Atlas" G4809, 3.0 g of "Alkyporox" OP250V, and 38.1 g water (demin). Add this solution slowly to the flask and stir for 1 hour.

To a 20 g sample of the resulting stable aqueous dispersion was added "Darocure" 1173 uv initiator (2% by weight an active material). A film of 50 μm wet thickness was cast on a polypropylene plaque, and after a 5 minutes flash off period at 80° C. cured by 3 passes under a uv lamp delivering 80 watts/cm at a speed of 10 m/minute.

The adhesion was measured by the Gitterschnitt method and a value of Gt-0 obtained.

We claim:

1. Method of coating a plastic substrate which method comprises applying an aqueous filmogenic coating composition to a plastic substrate, forming a film coating on the substrate by drying the composition, and concurrently and/or subsequently to said coating formation polymerising the olefinically unsaturated component or components therein, said aqueous filmogenic coating composition comprising a stable aqueous dispersion derived from dispersing into water, with the aid of at least one surfactant, an organic solvent solution comprising at least one chlorinated polyolefin, at least one olefinically unsaturated monomer polymerizable to a polymer during coating formation or after coating formation, or both, and at least one filmogenic polymer, the water of said aqueous dispersion being present in an amount of at least 5% by weight of said composition and said at least one olefinically unsaturated monomer comprising at least one (meth)acrylic monomer having the formula

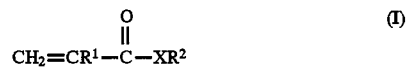

wherein $R^1$ is H or methyl,

X is —O— or —NH— and $R^2$ is alkyl or cycloalkyl having 1–20 carbon atoms or a bicyclic terpene group.

2. Method according to claim 1 wherein the plastic substrate coated is a polypropylene substrate.

3. Method according to claim 1 wherein the plastic substrate coated is selected from a polyphenylene oxide substrate, an acrylonitrile/butadiene/styrene copolymer substrate, and a polystyrene substrate.

4. A coated plastic substrate which has been made using a method according to any one of claims 1 and 3.

5. A substrate coated with a film coating which has been derived from an aqueous filmogenic coating composition comprising a stable aqueous dispersion derived from dispersing into water, with the aid of at least one surfactant, an organic solvent solution comprising at least one chlorinated polyolefin, at least one olefinically unsaturated monomer polymerizable to a polymer during coating formation or after coating formation, or both, and at least one filmogenic polymer, the water of said aqueous dispersion being present in an amount of at least 5% by weight of said composition and said at least one olefinically unsaturated monomer comprising at least one (meth)acrylic monomer having the formula

wherein $R^1$ is H or methyl,

X is —O— or —NH— and $R^2$ is alkyl or cycloalkyl having 1–20 carbon atoms or a bicyclic terpene group after polymerisation of the unsaturated component or components therein.

* * * * *